Patented Feb. 17, 1942

2,273,506

UNITED STATES PATENT OFFICE 2,273,506

RECLAIMING OF RUBBER

Otto Bächle, Cologne, Germany, assignor, by mesne assignments, to General Aniline & Film Corporation, New York, N. Y., a corporation of Delaware No Drawing. Application April 17, 1939, Serial No. 268,331. In Germany April 28, 1936

3 Claims. (Cl. 260—714)

The present invention relates to improvements in the reclaiming of rubber from vulcanized products. In practice, natural rubber is reclaimed from its vulcanizates, for instance, by heating the same with a relatively high concentrated caustic soda solution or with the solution of a mineral acid. Moreover, the heating can be effected in the presence of an indifferent high boiling solvent such as tetrahydronaphthalene. These processes generally require the application of high temperatures of about 180° C., the heating being continued for a prolonged time, say about 5 to 15 hours. Whereas processes of the character described are practically used for the reclaiming of natural rubber from its vulcanizates, there is still a lack of suitable reclaiming processes for synthetic rubber-like materials which are obtained by the polymerization or co-polymerization of butadienes and other polymerizable compounds.

It is the object of the present invention to develop a new process which allows one to effect the reclaiming of rubber from its vulcanizates at a lower temperature and more quickly than it was hitherto possible. Another object of my invention resides in the developing of auxiliary agents which are suitable for the reclaiming of natural rubber as well as of synthetic rubber-like materials of the character described. Other objects will be apparent from the following description and claims.

I have found that the reclaiming of rubber (either natural or synthetic) by heating in the presence of oxygen (for instance in form of air), if desired in the presence of a solvent, can be considerably accelerated, if the reclaiming process is performed in the presence of a small amount of a mono-aryl hydrazine. In general, about 1–5% of the said auxiliary agents are sufficient to bring about the desired result, though lower amounts, i. e. down to about 0.1%, are also effective. I prefer to work between about 70 and 140° C., more particularly at about 120° C. At any rate, the presence of the auxiliary agents of the character described effects that the reclaiming process is carried out at a lower temperature and more quickly, viz. within a few hours, i. e. under milder conditions than according to the hitherto known processes.

Examples for auxiliary agents of the character described are phenyl hydrazine and its substitution products such as nitrophenyl hydrazine, aminophenyl hydrazine and toluyl hydrazine and the salts thereof with organic acids such as oleic acid, and finally, complex salts of the said monoaryl hydrazines with inorganic salts. It is supposed that the monoaryl hydrazines must be free from groups inducing solubility in water as such groups would prevent the interpenetration of the rubber to be reclaimed and of the auxiliary agents. The auxiliary agents of the character described can be incorporated within the vulcanizates in various ways, for instance, in a kneading machine, if desired with the addition of agents exerting a certain softening effect and facilitating a complete interpenetration of the rubber and the said auxiliary agents. As examples there may be mentioned: paraffine, colophonium or stearic acid, furthermore solvents such as benzene, toluene, xylene or mineral oils.

As examples for synthetic rubber-like materials which can be reclaimed from their vulcanizates there may be mentioned polymeric butadienes such as polymeric butadiene-1.3, or isoprene and co-polymerizates of such butadienes and other polymerizable compounds such as styrene.

The following examples illustrate the present invention without, however, restricting it thereto, the parts being by weight:

Example 1

100 parts of a ground soft rubber vulcanizate are heated in a kneading machine with 30 parts of mineral oil and 5 parts of phenyl hydrazine to 100° C. for about 20 hours, free access of air or oxygen being allowed. The resulting product represents a soft and plastic material which can be easily worked up into vulcanizable mixtures and, upon vulcanization, yields products of good aging properties. In case the heating of the soft rubber vulcanizate is performed under the same conditions but without the addition of phenyl hydrazine, the resulting product still resembles vulcanized rubber rather than a unvulcanized one.

Example 2

15 parts of a ground vulcanizate of a synthetic rubber prepared by the emulsion polymerization of 75 parts of butadiene and 25 parts of styrene are heated with 50 parts of xylene and 0.4 part of phenyl hydrazine while stirring and introducing air into the mixture. After a 10 hours' heating to 120° C. the vulcanizate is strongly swollen and can be reused for vulcanization.

Example 3

In case the synthetic rubber of the character described in the preceding example is replaced by the product of the emulsion polymerization of 75 parts of butadiene and 25 parts of acrylic acid nitrile a somewhat longer heating (about 20 hours or more) is necessary to bring about a similar result.

The above examples disclose the use of unsubstituted phenyl hydrazine it being to be understood that they are in no way limitative. My experiments have proved that phenyl hydrazine can be replaced with a similar result by Bz-alkyl substitution products thereof such as toluyl or xyloyl hydrazine and also by other substitution products such as nitro- or aminophenyl hydrazine though the latter products do not appear to be as effective as phenyl hydrazine itself.

I claim:

1. The reclaiming of vulcanized rubber scrap selected from the group consisting of natural rubber, polymeric butadiene-1.3 hydrocarbons and copolymerizates of butadiene-1.3 hydrocarbons with other copolymerizable compounds, by heating the same for from about ten to about twenty hours in the presence of a solvent to a temperature of from about 100 to about 140° C. while bubbling an oxygen-containing gas through the mix and in the presence of a monoarylhydrazine.

2. The process as claimed in claim 1 wherein the heating is effected at a temperature of about 120° C.

3. The process as claimed in claim 1 wherein the monoarylhydrazine is phenylhydrazine.

OTTO BÄCHLE.